(12) United States Patent
Schultz

(10) Patent No.: US 12,158,314 B2
(45) Date of Patent: Dec. 3, 2024

(54) REDUCED PRESSURE DROP COLD PLATE TRANSITION

(71) Applicant: International Business Machines Corporation, Armonk, NY (US)

(72) Inventor: Mark D. Schultz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/200,200

(22) Filed: May 22, 2023

(65) Prior Publication Data
US 2023/0296332 A1     Sep. 21, 2023

Related U.S. Application Data

(62) Division of application No. 17/134,387, filed on Dec. 26, 2020, now Pat. No. 11,698,233.

(51) Int. Cl.
*F28F 3/12*      (2006.01)
*G06F 30/28*     (2020.01)
(Continued)

(52) U.S. Cl.
CPC ............... *F28F 3/12* (2013.01); *G06F 30/28* (2020.01); *H01L 23/473* (2013.01);
(Continued)

(58) Field of Classification Search
CPC ............... H01L 21/4871; H01L 23/473; H01L 23/3735; H01L 2224/48091; H01L 23/467;
(Continued)

(56) References Cited

U.S. PATENT DOCUMENTS

| 5,393,617 A | 2/1995 | Klein |
| 5,832,736 A * | 11/1998 | Yoshioka ............. F28F 3/04 62/503 |

(Continued)

FOREIGN PATENT DOCUMENTS

| CN | 103841804 A | 6/2014 |
| CN | 107086337 A | 8/2017 |

(Continued)

OTHER PUBLICATIONS

Sarangan et al., An experimental study of heat transfer and pressure drop characteristics of divergent wavy minichannels using nanofluids. Heat and Mass Transfer. 1;53(3):959-71, Jul. 2016.
(Continued)

*Primary Examiner* — Adam B Dravininkas
(74) *Attorney, Agent, or Firm* — Daniel Morris; Otterstedt & Kammer PLLC

(57) ABSTRACT

A cold plate apparatus that has an outlet plenum leading to an outlet opening includes an outlet transition that connects the outlet opening to the outlet plenum. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening. The outlet transition provides a smooth variation of cross-sectional area from the outlet plenum to the outlet opening.

9 Claims, 8 Drawing Sheets

(51) Int. Cl.
  *G06F 113/08* (2020.01)
  *H01L 23/473* (2006.01)
  *H05K 7/20* (2006.01)

(52) U.S. Cl.
  CPC ..... *H05K 7/20254* (2013.01); *H05K 7/20272* (2013.01); *G06F 2113/08* (2020.01)

(58) Field of Classification Search
  CPC ... H01L 21/67103; G06F 30/28; G06F 30/20; G06F 2113/08; G06F 1/20; G06F 21/79; G06F 2200/201; H05K 7/20927; H05K 7/20254; H05K 7/20272; H05K 7/20936; H05K 7/20781
  See application file for complete search history.

(56) References Cited

U.S. PATENT DOCUMENTS

| | | | |
|---|---|---|---|
| 5,983,997 | A | 11/1999 | Hou |
| 6,924,981 | B2 | 8/2005 | Chu |
| 7,277,283 | B2 | 10/2007 | Campbell |
| 7,367,386 | B2 | 5/2008 | Sato et al. |
| 7,545,648 | B2 | 6/2009 | Karidis |
| 8,017,279 | B2 | 9/2011 | Hood |
| 8,999,548 | B2 | 4/2015 | Sun |
| 9,425,124 | B2 | 8/2016 | Karidis |
| 9,894,801 | B1 | 2/2018 | Marroquin et al. |
| 9,939,210 | B2 | 4/2018 | Schultz |
| 9,997,435 | B2 | 6/2018 | Karidis |
| 10,085,362 | B2 | 9/2018 | Chainer |
| 10,109,898 | B2 | 10/2018 | Gruenwald et al. |
| 10,168,108 | B2 | 1/2019 | Schultz |
| 10,326,119 | B2 | 6/2019 | Obrist |
| 10,727,159 | B2 | 7/2020 | Brunschwiler |
| 11,698,233 | B2 | 7/2023 | Schultz |
| 2007/0000650 | A1 | 1/2007 | Nishimura |
| 2007/0062681 | A1 | 3/2007 | Beech |
| 2008/0166277 | A1 | 7/2008 | Son |
| 2012/0097368 | A1* | 4/2012 | Chen ............ F28F 13/08 165/104.21 |
| 2012/0201005 | A1 | 8/2012 | Barringer |
| 2014/0043765 | A1 | 2/2014 | Gohara |
| 2014/0054762 | A1 | 2/2014 | Nagaune |
| 2014/0162107 | A1 | 6/2014 | Obrist |
| 2014/0196871 | A1 | 7/2014 | Otsuka |
| 2016/0343640 | A1* | 11/2016 | Gohara ............ H05K 7/20927 |
| 2016/0343694 | A1 | 11/2016 | Lin |
| 2018/0098459 | A1 | 4/2018 | Chainer |
| 2019/0221499 | A1 | 7/2019 | Chang |
| 2020/0027819 | A1* | 1/2020 | Smith ............ H01L 23/4735 |
| 2020/0214176 | A1 | 7/2020 | Tokeshi |
| 2022/0205740 | A1 | 6/2022 | Schultz |
| 2022/0210946 | A1 | 6/2022 | Schultz |
| 2022/0377940 | A1 | 11/2022 | Yang |

FOREIGN PATENT DOCUMENTS

| | | |
|---|---|---|
| CN | 107248507 A | 10/2017 |
| CN | 208285719 U | 12/2018 |
| CN | 109950656 A | 6/2019 |
| DE | 602006000470 | 1/2009 |
| DE | 102014202542 | 8/2015 |
| DE | 102017216598 | 3/2019 |
| DE | 112017005475 | 7/2019 |
| DE | 102019008611 | 10/2020 |
| EP | 2744034 | 6/2014 |
| EP | 3352216 A | 7/2018 |
| JP | 2016012616 A | 1/2016 |

OTHER PUBLICATIONS

Authorized Officer Christoph Wirner, European Patent Office as ISA, related International application PCT/EP2021/084557, ISR and Written Opinion, 28 pages total, mailed Apr. 7, 2022 Note—pp. 6-20 of This Document Include an English Tranbslation of JP2016012616.

Intellectual Property Office of the United Kingdom, Combined Search and Examination Report GB2117486.7, 6 pages total, May 16, 2022.

German Patent and Trade Mark Office, counterpart German application 10 2021 130 964.6, Office Action dated Jun. 23, 2022, 6 pages.

Harrison, IBM Appendix P, pp. 1-2, Dec. 2020.

Duan et al., Pressure drop of impingement air cooled plate fin heat sinks, pp. 1-6, Jun. 2007.

Paul J. Otterstedt, List of IBM Patents or Patent Applications Treated as Related, Feb. 26, 2024, pp. 1-2.

* cited by examiner

REDUCED PRESSURE DROP COLD PLATE TRANSITION

CROSS-REFERENCE TO RELATED APPLICATIONS

This application is a divisional of U.S. patent application Ser. No. 17/134,387 filed Dec. 26, 2020, the complete disclosure of which is expressly incorporated herein by reference in its entirety for all purposes.

BACKGROUND

The present invention relates to the electrical, electronic, thermal, mechanical, and computer arts, and more specifically, to apparatus for cooling computer components.

One type of apparatus for cooling computer components is the "cold plate," which is a conductive heat sink placed in contact with a component either directly or with intervening thermal interface material (TIM). A cold plate can be a solid block of metal, often with fins for enhanced air cooling; or it can be a hollow structure through which a coolant (e.g., water) flows from an inlet to an outlet. Such a hollow structure would include an active volume, often housing a set of fins, where the heat transfer from the component being cooled to the coolant occurs.

Often, coolant is introduced to and removed from a hollow cold plate via nozzles or fittings that protrude from the cold plate at an angle from (e.g., perpendicular to) the velocity of the coolant through the interior volume of the cold plate. Transition volumes that connect the nozzle flow to the generally perpendicular direction of interior volume flow often present turbulent or recirculating pressure drops that reduce flow or require increased pump capacity in the system. Accordingly, there is a need to improve flow behavior in the transition volumes.

SUMMARY

Principles of the invention provide techniques for tuning cold plate plenum transitions.

According to one aspect of this disclosure, an exemplary cold plate apparatus comprises walls that enclose an interior volume that includes an inlet plenum, an outlet plenum, and an active volume fluidly connecting the inlet plenum to the outlet plenum. The walls define an inlet opening into the inlet plenum and an outlet opening from the outlet plenum. The walls define an outlet transition that connects the outlet plenum to the outlet opening. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening. The outlet transition provides a smooth variation of cross-sectional area from the outlet plenum to the outlet opening.

According to another aspect, an exemplary cold plate apparatus comprises a top plate that has an inlet opening and an outlet opening through it; a bottom plate; and a plurality of intermediate plates sandwiched between the top and bottom plates and attached to each other and to the top and bottom plates. Each intermediate plate has a cutout, and the cutouts of the plurality of intermediate plates overlap to define an interior volume enclosed by the top plate, the bottom plate, and the intermediate plates. The interior volume includes an active volume, an inlet plenum at one side of the active volume, an outlet plenum at another side of the active volume opposite the inlet plenum, an inlet transition at an end of the inlet plenum overlapping the inlet opening, and an outlet transition at an end of the outlet plenum overlapping the outlet opening. Inward edges of the cutouts of the intermediate plates are staggered so that the outlet transition defines a curving flow path from a direction along a long dimension of the outlet plenum, which is parallel to a plane defined by the outlet opening, to a direction along a centerline of the outlet opening, which is at an angle from the plane defined by the outlet opening.

According to still another aspect, an exemplary method of making a cold plate apparatus comprises obtaining a plurality of plates; defining an inlet plenum, an active volume, an outlet plenum, an outlet opening, and an outlet transition connecting the outlet plenum to the outlet opening, by shaping a cutout in each plate and stacking the plurality of plates together in an assembly according to a final cold plate design; and bonding the plurality of plates together in the assembly. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening.

According to yet another aspect, an exemplary method of directing coolant through a cold plate apparatus comprises redirecting the coolant from an outlet plenum bulk velocity of flow along a length of an outlet plenum to an outlet opening bulk velocity of flow, at an angle from the outlet plenum bulk velocity, through an outlet opening that is connected in fluid communication with the outlet plenum; and releasing the coolant through the outlet opening. Redirecting the coolant from the outlet plenum bulk velocity to the outlet opening bulk velocity includes smoothly turning the direction of the coolant from the outlet plenum bulk velocity to the outlet opening bulk velocity, without significant recirculation or turbulence, inside an outlet transition structure formed in the cold plate and connecting the outlet plenum in fluid communication with the outlet opening, without significant recirculation or turbulence.

According to a further aspect, an exemplary apparatus comprises an electronic component that dissipates heat; a cold plate apparatus attached in thermal connection to the electronic component; and a pump that forces a liquid coolant through the cold plate apparatus. The cold plate apparatus comprises: a bottom portion surrounding an interior volume; and a top portion attached to the bottom portion and enclosing the interior volume. The top portion includes an outlet opening into the interior volume. The interior volume includes an outlet transition that connects the outlet opening to an outlet plenum. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening.

In view of the foregoing, techniques of the present invention can provide substantial beneficial technical effects. For example, one or more embodiments provide one or more of:

Enhanced flow profile through an active volume of the cold plate.

Reduced pressure drop at inlet and outlet of the cold plate.

Enhanced heat transfer within an active volume of the cold plate.

These and other features and advantages of the present invention will become apparent from the following detailed description of illustrative embodiments thereof, which is to be read in connection with the accompanying drawings.

DETAILED DESCRIPTION

A cold plate is a familiar structure in the field of semiconductor device cooling. A cold plate typically directs an incompressible fluid (e.g., liquid) flowing through a somewhat tortuous path to accomplish heat transfer from a semiconductor device through the structure of the cold plate into the fluid.

Figure 1:
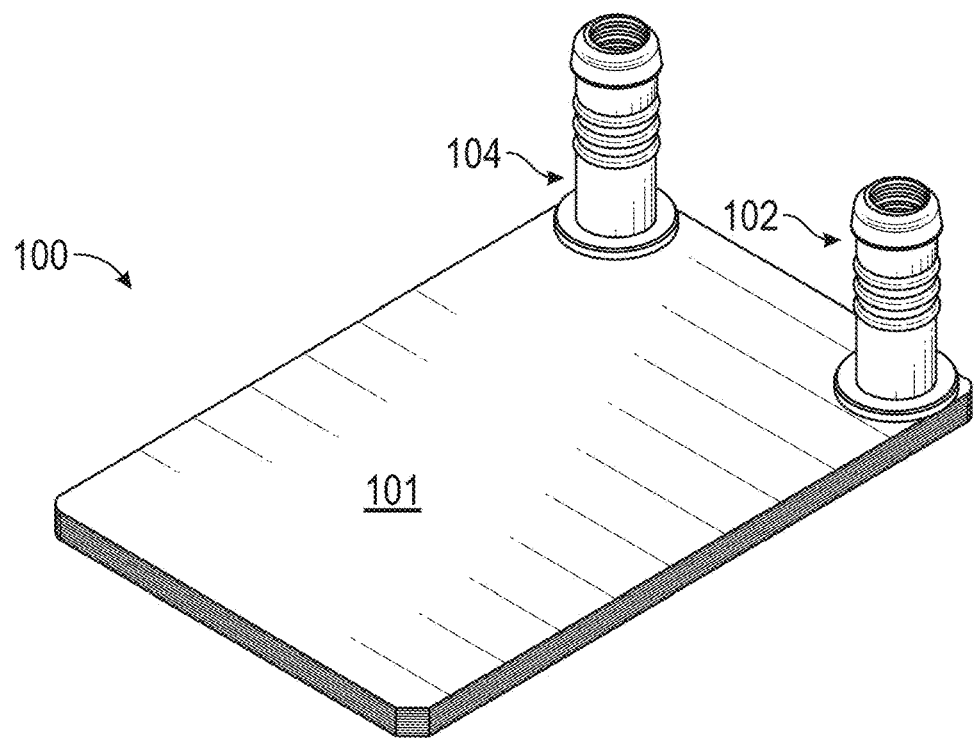
FIG. 1 depicts an exterior view of a conventional cold plate.
Figure 2:
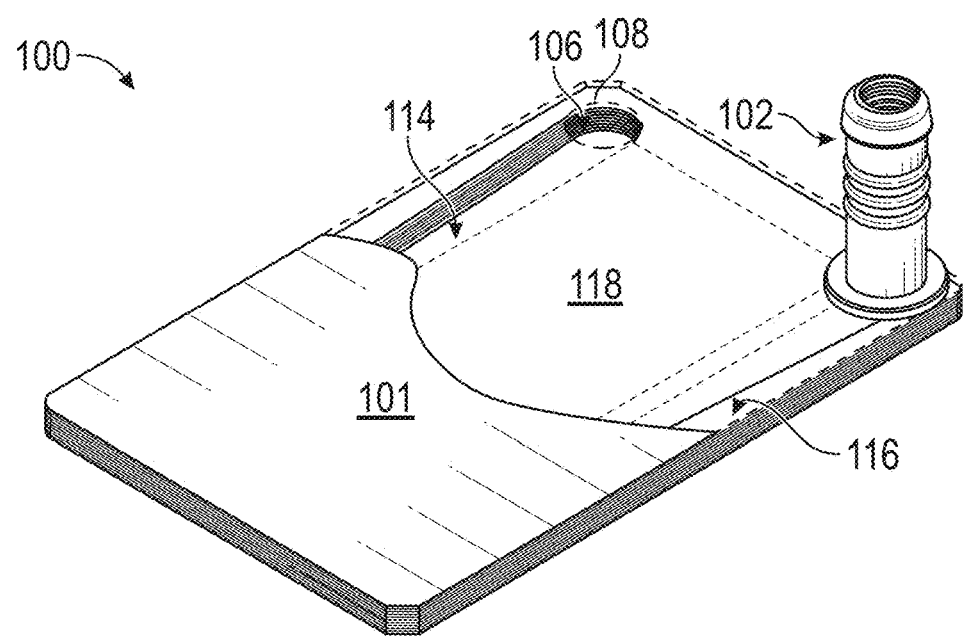
FIG. 2 depicts a top cutaway view of the cold plate of FIG. 1, showing a conventional transition from outlet plenum to outlet nozzle.

FIG. 1 depicts a cold plate 100 with a top plate 101, an inlet nozzle 102, and an outlet nozzle 104. FIG. 2 depicts a cutaway view of the cold plate 100. FIG. 2 shows a conventional outlet transition 106, an outlet opening 108, an outlet plenum 114, an inlet plenum 116, and an active volume 118. Flow through the cold plate 100 goes from the inlet nozzle 102 through the inlet plenum 116 and the active volume 118 to the outlet plenum 114, then through the outlet transition 106 and the outlet opening 108 to the outlet nozzle 104.

Notably, the conventional outlet transition 106 is a "hard" transition, that is it lacks any kind of structure to redirect flow from a direction along the outlet plenum 114 to a perpendicular direction through the outlet opening 108. As a result, flow from the outlet plenum 114 to the outlet nozzle 104 can become very turbulent and may generate significant recirculation as it abruptly changes direction by ninety degrees under the outlet opening 108. The turbulence and recirculation introduce significant pressure loss, which slows down the flow through the active volume 118 (i.e., for a fixed supply pressure the volumetric flow will be lower due to this undesirable pressure loss from turbulence, or a higher supply pressure will be needed to obtain the desired volumetric flow rate). The reduced volumetric flow rate due to pressure drop at the outlet transition 106 detracts from heat transfer in the active volume 118. Not only is there less coolant flowing through the active volume, but additionally the slower flow results in a lower heat transfer at the interface between the coolant and cold plate. Therefore, heat transfer in the active volume 118 with the conventional outlet transition 106 is significantly less than it could be if there was a reduced pressure drop between the outlet plenum 114 and the outlet opening 108 for a given available system pressure drop.

Figure 3:
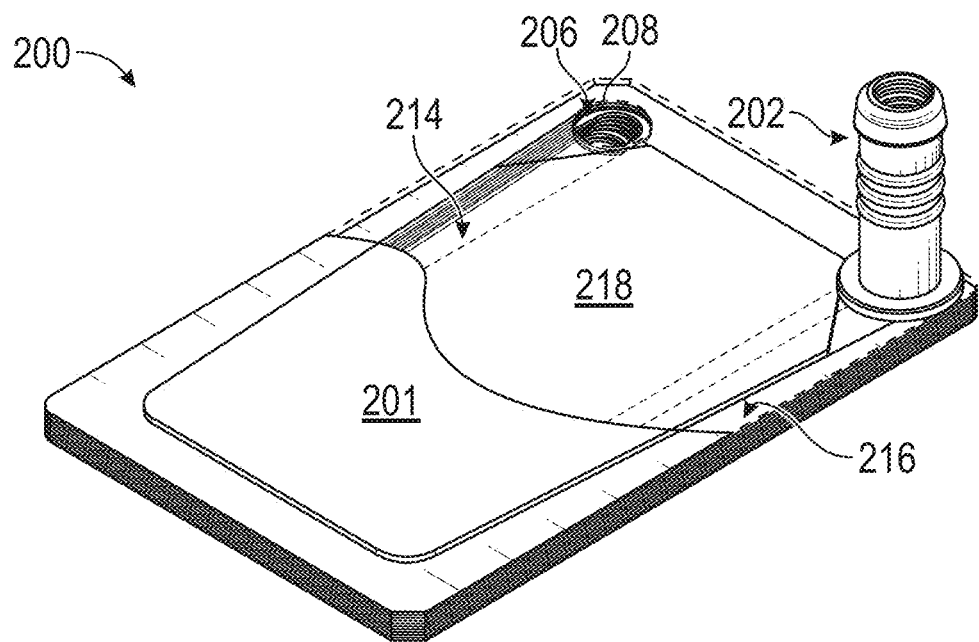
FIG. 3 depicts a top cutaway view of a cold plate with a reduced pressure drop outlet transition according to an exemplary embodiment.
Figure 5:
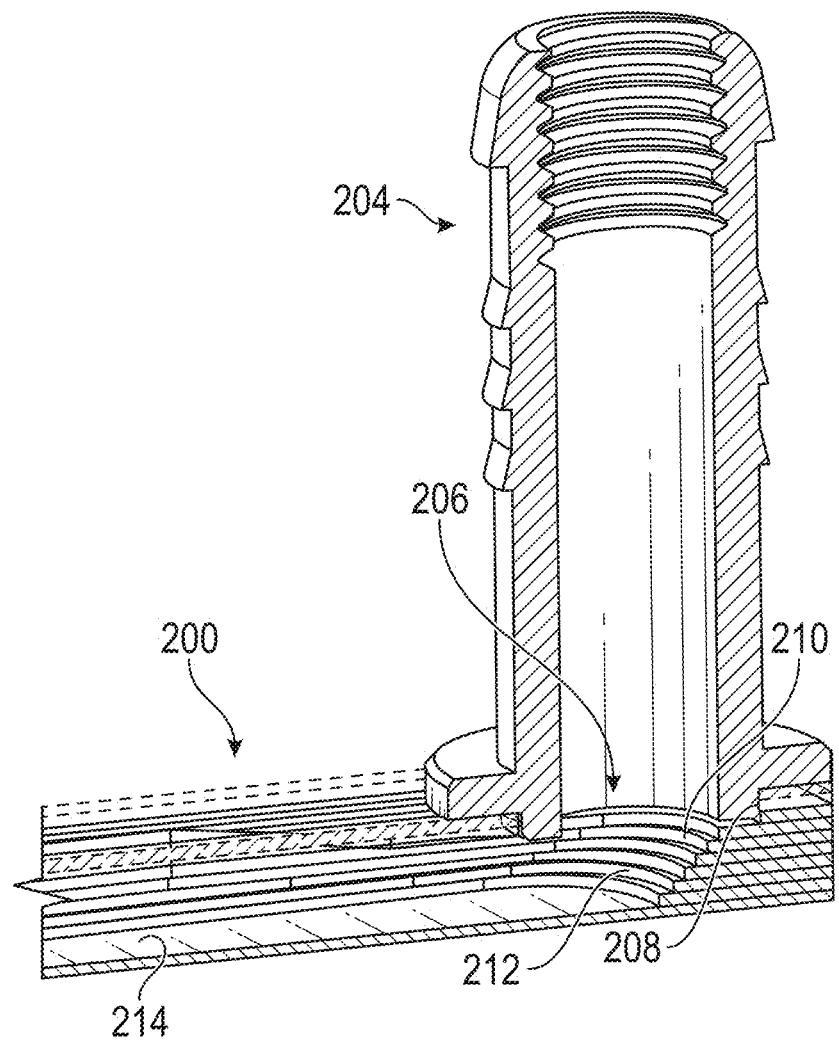
FIG. 5 depicts a side cutaway view of an outlet transition of the cold plate shown in FIG. 3.
Figure 6:
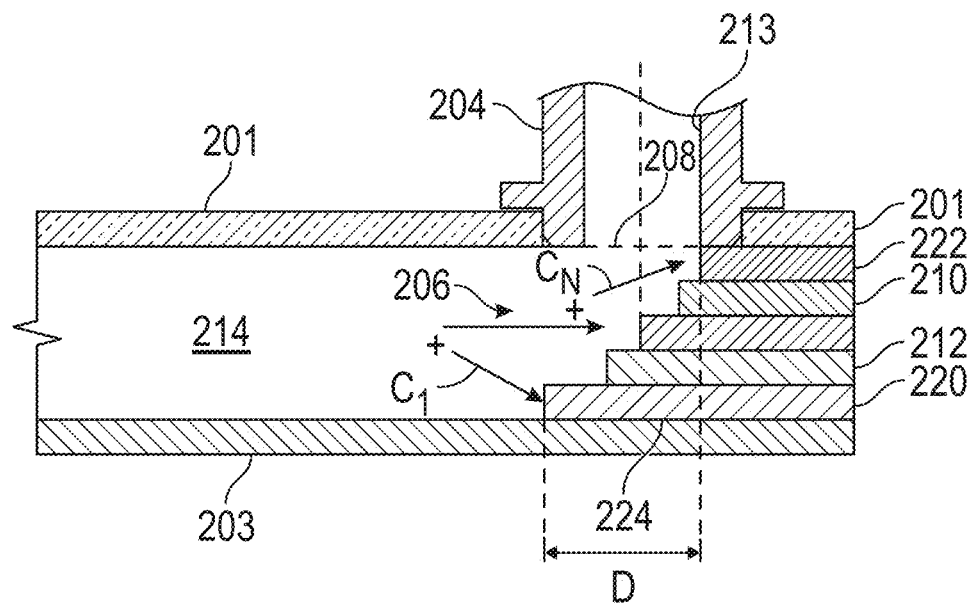
FIG. 6 depicts certain dimensions of the outlet transition shown in FIG. 5.

In view of this understanding, one or more embodiments advantageously provide a smooth transition from outlet plenum to outlet opening and/or from inlet opening to inlet plenum, with a reduced pressure drop, which in turn enhances coolant flow rate and heat transfer in the active volume for the same supply pressure. In this regard, FIG. 3 depicts a top cutaway view of a cold plate 200 with a reduced pressure drop outlet transition 206 according to an exemplary embodiment. The exemplary cold plate 200 has a top plate 201, an inlet nozzle 202, and an outlet nozzle 204 (not shown in FIG. 3, but attached at an outlet opening 208 and shown in FIG. 5). The top plate 201 covers an outlet plenum 214, an inlet plenum 216, and an active volume 218. In one or more embodiments, the active volume 218 includes an extended surface for enhanced heat transfer (e.g., fins, pins, or mesh surface that establishes channels fluidly connecting the inlet plenum 216 to the outlet plenum 214). In one or more embodiments, the top plate 201 has a cutout matching an outer diameter of the outlet nozzle 204. A centerline of the outlet nozzle 204 extends at an angle (e.g., in one or more embodiments greater than 50°; in other embodiments, greater than 70°; in other embodiments, greater than 85°) from a length of the outlet plenum 214. The outlet transition 206 connects the outlet plenum 214 in fluid communication with the outlet opening 208. In one or more embodiments, the outlet opening 208 is formed in a topmost intermediate plate 222 (as shown in FIG. 6, immediately underlying the top plate 201) and matches an inner diameter of the outlet nozzle 204. In one or more embodiments, as shown in FIG. 8, a similar reduced pressure drop inlet transition 207 may be provided to connect the inlet nozzle 202 and the inlet opening 209 with the inlet plenum 216.

Figure 4:
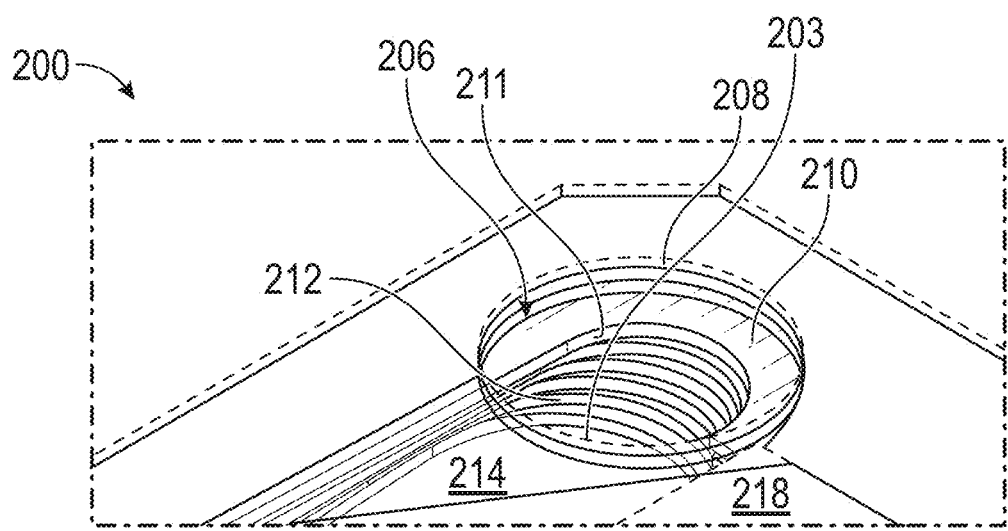
FIG. 4 depicts a detail view of the cold plate shown in FIG. 3.
Figure 8:
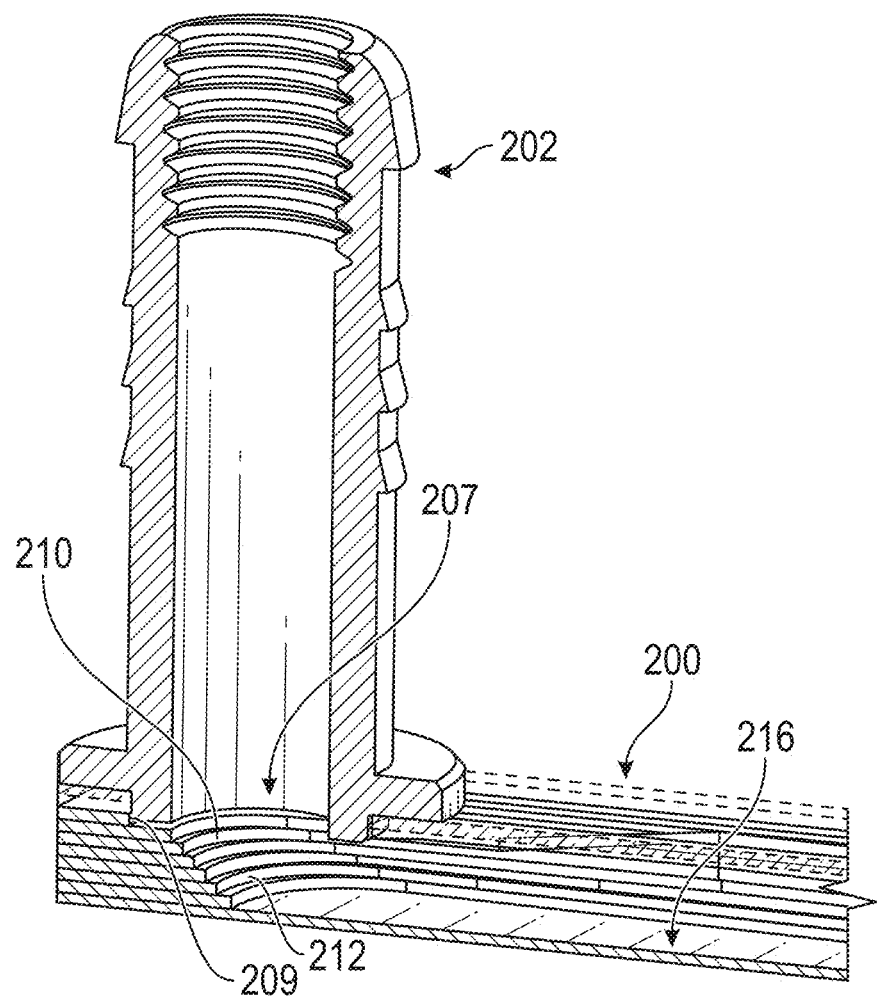
FIG. 8 depicts a side cutaway view of an inlet transition of the cold plate shown in FIG. 3.

Referring also to FIGS. 4 and 8, in one or more embodiments the inventive cold plate 200 is laminated, that is, built as a stack of plates fastened together; e.g., the top plate 201 (see FIG. 3), a bottom plate 203, and intermediate plates such as 210 and 212. Thus, a plurality of intermediate plates 210, 212 are sandwiched between the top and bottom plates 201, 203 and are attached to each other and to the top and bottom plates. For example, the plates may be attached together by diffusion bonds or by thermal compression bonds. In other embodiments, the cold plate 200 is fabricated from two cast or machined pieces (the top "plate" 201 and the bottom "plate" 203) or is made in a single piece by additive manufacturing (e.g., 3-D printing). The bonds between plates are coolant (e.g., water) tight. Each intermediate plate has a cutout, e.g., 211, and the cutouts of the plurality of intermediate plates overlap to define an interior volume that is enclosed by the top plate, the bottom plate, and the intermediate plates. The interior volume includes the active volume 218, the inlet plenum 216 at one side of the active volume, the outlet plenum 214 at another side of the active volume opposite the inlet plenum, the inlet transition 207 at an end of the inlet plenum that overlaps the inlet opening, and the outlet transition 206 at an end of the outlet plenum 214 that overlaps the outlet opening 208. In one or more embodiments, the inlet opening 209 and inlet transition 207 are symmetric to the outlet opening 208 and outlet transition 206.

In one or more embodiments, the first end of the outlet transition 206 is underneath a footprint of the outlet opening 208 projected into the interior volume of the apparatus and is offset from the centerline of the outlet opening toward the outlet plenum. Advantageously, the transition 206 is structured to eliminate blind ends extending beyond the outlet opening 208. In one or more embodiments, as shown in FIG. 6, the transition begins at a distance D before an edge 213 of the outlet opening 208 that is distal from the plenum 214. For example, the transition may begin at a point that is offset from the distal edge 213 of the outlet opening 208 by at least 10% of the outlet opening diameter. In one or more embodiments, the distance D is on the order of one half of the outlet diameter from the distal edge of the outlet opening 208 footprint. The beginning 224 of the transition 206 is chosen to maintain a substantially constant or smoothly varying cross-section of flow as the transition turns the flow from a direction along the length of the plenum 214 to a direction through the outlet opening at an angle (e.g., in one or more embodiments greater than 50°; in other embodiments, greater than 70°; in other embodiments, greater than 85°) from the length of the plenum 214. If the plenum 214 has a larger cross-section than the outlet opening 208 cross-section, then the transition begins further from the distal edge 213 of the outlet opening, i.e., the distance D would be further into the plenum 214 than one-half the diameter of the outlet opening 208. For example, in connecting a larger plenum cross-section to a smaller outlet opening cross-section, the transition starts further into the plenum as part of a smooth variation of cross-section.

In one or more embodiments, a smooth variation of cross-sectional area is one for which computational fluid dynamics (CFD) analysis, performed using ANSYS® or other CFD software, indicates no significant recirculation or turbulence of flow in the transition. (ANSYS is a registered trademark of ANSYS, INC. of Canonsburg, Pennsylvania.) In one or more embodiments, "significant" recirculation or turbulence is recirculation or turbulence that contributes more than 5% of the overall pressure drop through the transition volume. In one or more embodiments, the CFD mesh size is reduced (i.e., more, smaller elements) until maximum and minimum velocity values obtained with a smaller ("optimum") mesh size remain within 5% of values obtained with a next larger mesh size. In one or more embodiments, the CFD analysis is performed for the design coolant (e.g., water, glycol, mixtures thereof) at a range of design mass or volumetric flow rates and temperatures.

In one or more embodiments, a "planar" cross-section of the outlet transition 206, taken at each intermediate plate parallel to the surface of the plenum opposite the outlet opening, varies in radius R from the lowest intermediate plate 220 toward the topmost intermediate plate 222.

Figure 7:
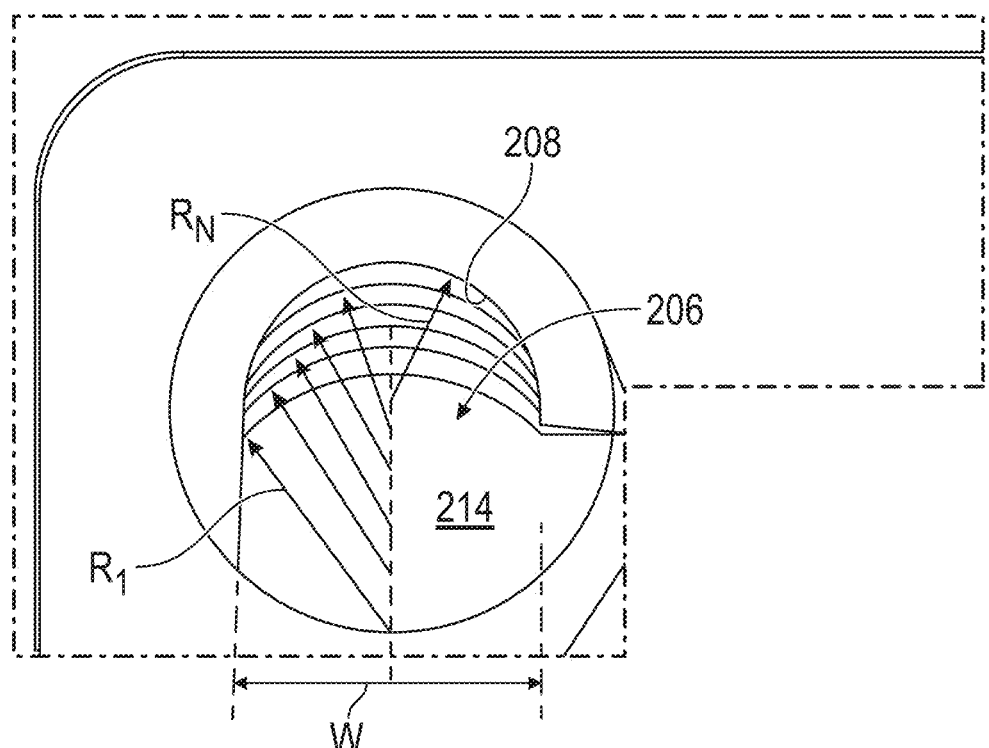
FIG. 7 depicts certain dimensions of the outlet transition shown in FIG. 5.

In one or more embodiments, the planar cross-section of the outlet transition diminishes in radius from the lowest intermediate plate toward the topmost intermediate plate. In other words, as shown in FIG. 7, where each layer of intermediate plate is a layer i=1 . . . N from bottom to top, the radius $R_i$ at layer i diminishes as i increases. For example, in one or more embodiments wherein the radius of the outlet opening 208 is less than one half the width of the outlet plenum 214, at the lowest intermediate plate 220 the radius $R_1$ of the outlet transition is at least one half the width W of the plenum. Then at the intermediate plate 222 adjacent to the outlet opening, the radius $R_N$ of the outlet transition is equal to the radius of the outlet opening. In one or more embodiments, the cross-section of the outlet transition 206, taken at each intermediate plate perpendicular to the centerline of the outlet opening 208, shifts its center toward the centerline of the outlet opening from the lowest intermediate plate 220 toward the topmost intermediate plate 222. In one or more embodiments, an edge of the cross-section of the outlet transition 206 shifts toward the distal edge 213 of the outlet opening 208, along the long direction of the outlet plenum 214, from the lowest intermediate plate 220 toward the topmost intermediate plate 222.

Additionally, the transition provides a smoothly diminishing radius of curvature C for turning the flow. For example, a radius of curvature $C_1$ from the transition flow centerline to the lowest intermediate plate 220 is greater than a radius of curvature CN from the transition flow centerline to the topmost intermediate plate 222. A smooth change in radius of curvature is beneficial for reduced pressure drop. In one or more embodiments, the radius of curvature C (shown in FIG. 6) of the transition 206 is at least equal to one half the width W (shown in FIG. 7) of the outlet plenum at the beginning of the transition and is at least equal to the radius $R_N$ (shown in FIG. 7) of the outlet opening at the end of the transition. In one or more embodiments, the radius of curvature $C_i$ of the transition is approximately equal to the radius $R_i$ of the cross-section of the transition at each point along the transition. Generally, a smooth change in radius of curvature is such that CFD analysis, as discussed above, shows smoothly turning flow, i.e., monotonically changing flow vectors without significant recirculation or turbulence.

Thus, in one or more embodiments, the outlet transition 206 is shaped to provide a smooth (generally non-turbulent, non-recirculating) change in direction of the coolant flowing from the outlet plenum 214 through the outlet opening 208 into an outlet nozzle 204. In other words, the outlet transition 206 is coextensive with the outlet plenum 214 at a first end and coextensive with the outlet opening 208 at a second end, and the first end of the outlet transition 206 is offset from the centerline of the outlet opening 208 along the long direction of the outlet plenum, so that the outlet transition 206 defines a smoothly curving flow path from a direction along a long dimension of the outlet plenum 214, which is parallel to a plane defined by the outlet opening 208, to a direction along a centerline of the outlet opening 208, which is at an angle from (e.g., in one or more embodiments greater than 50°; in other embodiments, greater than 70°; in other embodiments, greater than 85°) the plane defined by the outlet opening. In one or more embodiments, a smoothly curving surface for the outlet transition 206 can be constructed from a stack of N+1 layered intermediate plates 210, 212, 220, 222 by staggering inward edges of the plates so that a distance $D_i$ from an inward edge of each plate i to the inner edge 213 of the outlet opening 208 varies according to $D_i=D_i (1-(i-1)/N)$. In a non-limiting example, the smoothly curving surface can be formed from a number of small, discrete steps corresponding, for example, to the plates used to build up the cold plate. In a non-limiting example, there are at least five such steps between the top and bottom plates, sequentially recessed as shown in FIG. 6.

Figure 9:
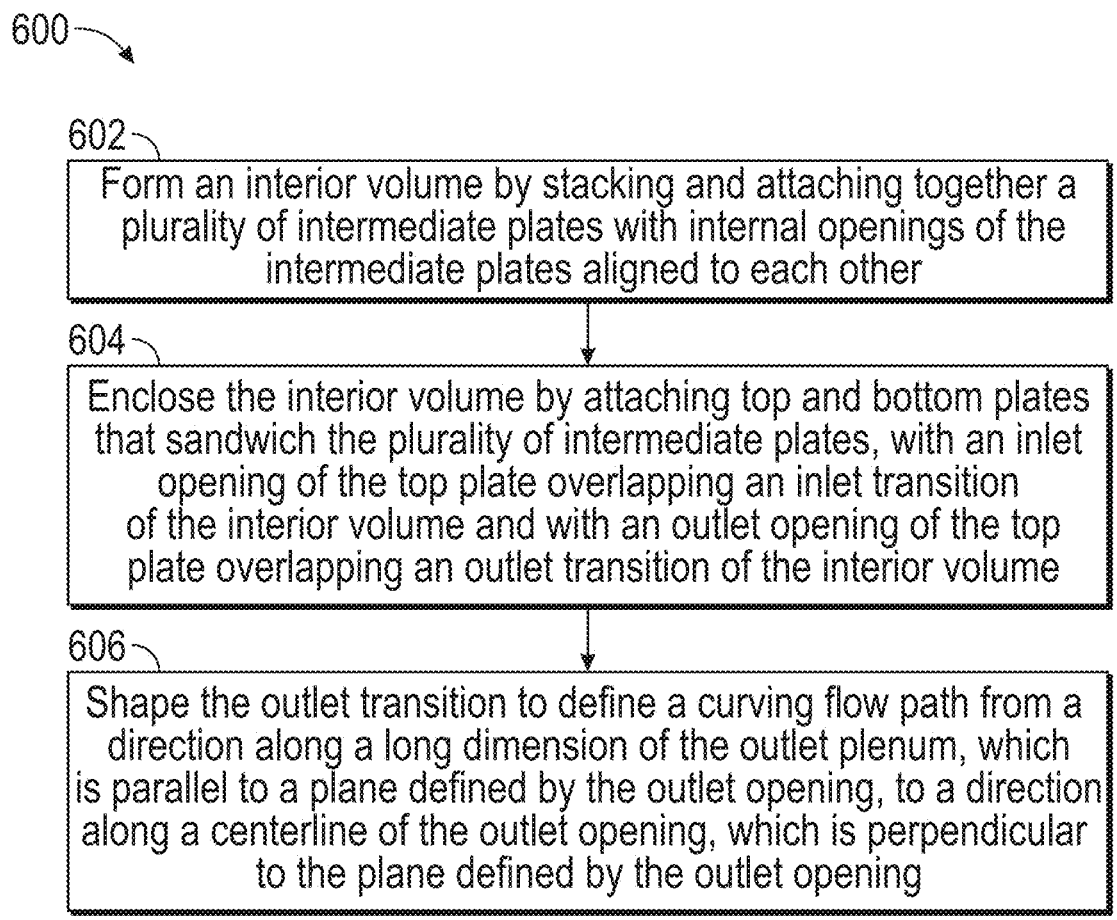
FIG. 9 depicts in a flowchart steps of a method for making a cold plate apparatus, according to an exemplary embodiment.

Thus, FIG. 9 depicts a method 600 of making a cold plate apparatus, according to an exemplary embodiment. The method 600 includes at 602 forming an interior volume by stacking and attaching together a plurality of intermediate plates 210, 212 with cutouts of the intermediate plates aligned to each other. The interior volume includes an active volume 218, an inlet plenum 216 at one side of the active volume, an outlet plenum 214 at another side of the active volume opposite the inlet plenum, an inlet transition 207 (shown in FIG. 8) at an end of the inlet plenum, and an outlet transition 206 at an end of the outlet plenum. The method

600 also includes at 604 enclosing the interior volume by attaching top and bottom plates 201, 203 that sandwich the plurality of intermediate plates, with an inlet opening 209 of the top plate overlapping the inlet transition 207 of the interior volume and with an outlet opening 208 of the top plate overlapping the outlet transition 206 of the interior volume. The method also includes at 606 shaping the outlet transition to define a curving flow path from a direction along a long dimension of the outlet plenum, which is parallel to a plane defined by the outlet opening, to a direction along a centerline of the outlet opening, which is at an angle from (e.g., in one or more embodiments greater than 50°; in other embodiments, greater than 70°; in other embodiments, greater than 85°) the plane defined by the outlet opening. Steps of the method can be done in other orders, i.e., step 606 can be performed as part of step 602 and/or before step 604 (for example, by assembling pre-profiled sheets). For example, in one or more embodiments, the interior volume including the outlet transition can be formed by milling a billet stock; then the top plate can be attached. In one or more embodiments, the entire cold plate can be formed by additive manufacturing such as three-dimensional (3D) printing.

Figure 10:
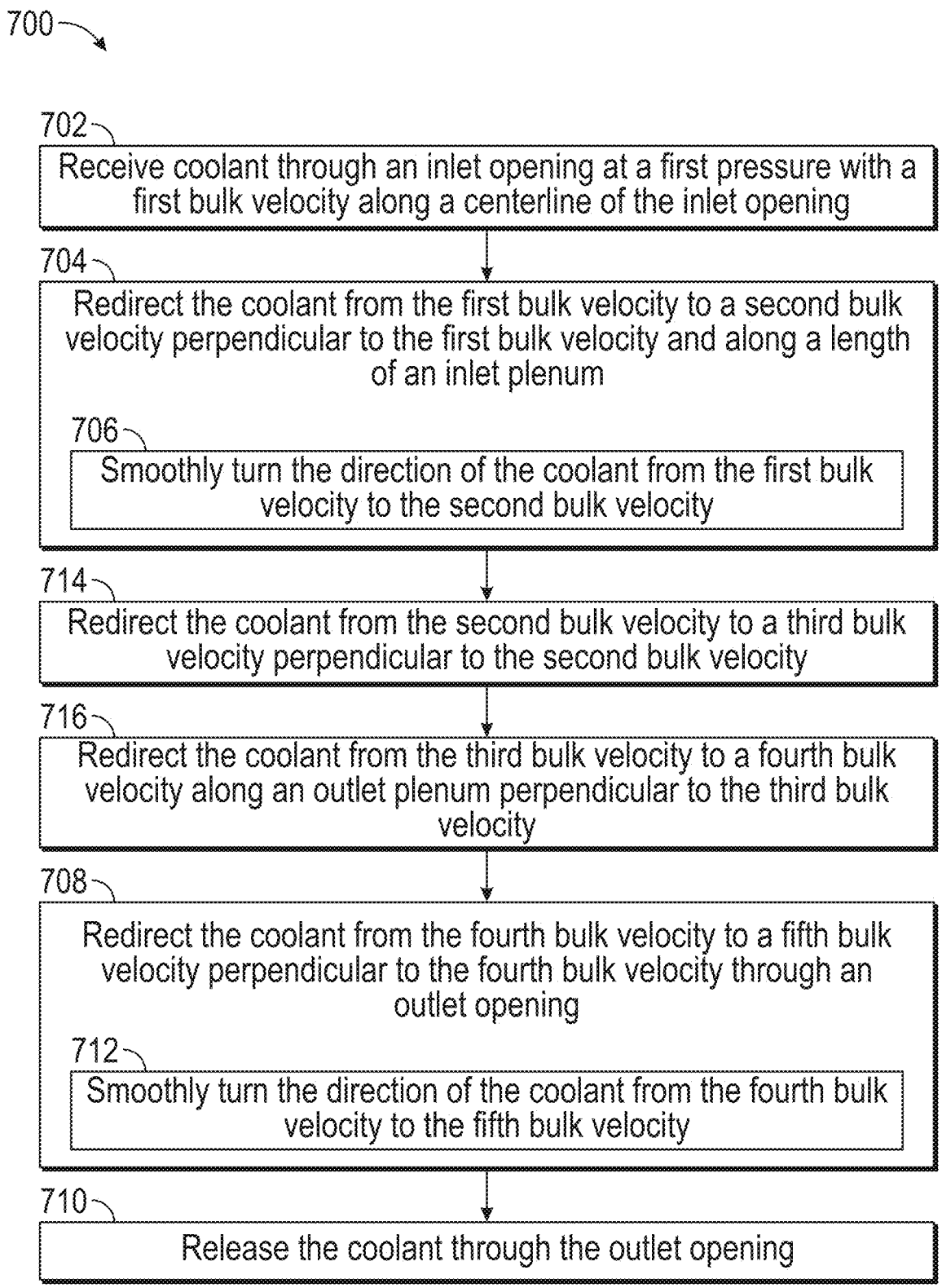
FIG. 10 depicts in a flowchart steps of a method for modifying coolant flow through a cold plate apparatus, according to an exemplary embodiment.

According to another aspect, FIG. 10 depicts a method 700 of directing coolant through a cold plate apparatus. The method 700 includes at 702 receiving the coolant through an inlet opening at an inlet pressure with an inlet opening bulk velocity along a centerline of the inlet opening. At 704 the method includes initially redirecting the coolant from the inlet opening velocity to an inlet plenum bulk velocity at an angle (e.g., in one or more embodiments greater than 50°; in other embodiments, greater than 70°; in other embodiments, greater than 85°) from the inlet opening velocity and along a length of an inlet plenum that is connected in fluid communication with the inlet opening. For example, in one or more embodiments, initially redirecting the coolant includes at 706 smoothly turning the direction of the coolant from the inlet opening velocity to the inlet plenum bulk velocity, inside an inlet transition structure formed in the cold plate and connecting the inlet opening in fluid communication with the inlet plenum, such that generally laminar and non-recirculating flow is maintained within the inlet transition structure. Recall that in one or more embodiments of the cold plate apparatus 200, an inlet transition is identical or similar to the outlet transition 206.

In one or more embodiments, the method 700 also includes at 714 redirecting the coolant from the inlet plenum bulk velocity to an active volume bulk velocity, at an angle (e.g., in one or more embodiments greater than 50°; in other embodiments, greater than 70°; in other embodiments, greater than 85°) from the inlet plenum bulk velocity, through an active volume adjacent to the inlet plenum; and at 716 redirecting the coolant from the active volume bulk velocity to an outlet plenum bulk velocity, at an angle (e.g., in one or more embodiments greater than 50°; in other embodiments, greater than 70°; in other embodiments, greater than 85°) from the active volume bulk velocity.

In one or more embodiments, the method 700 also includes at 708 finally redirecting the coolant from the outlet plenum bulk velocity flow along a length of an outlet plenum to an outlet opening bulk velocity of generally laminar flow at an angle (e.g., in one or more embodiments greater than 50°; in other embodiments, greater than 70°; in other embodiments, greater than 85°) from the outlet plenum bulk velocity through an outlet opening that is connected in fluid communication with the outlet plenum; and at 710 releasing the coolant through the outlet opening. In one or more embodiments, finally redirecting the coolant includes at 712 smoothly turning the direction of the coolant from the outlet plenum bulk velocity to the outlet opening bulk velocity, inside an outlet transition structure formed in the cold plate and connecting the outlet plenum in fluid communication with the outlet opening, such that generally laminar flow is established within the outlet transition structure.

Figure 11:
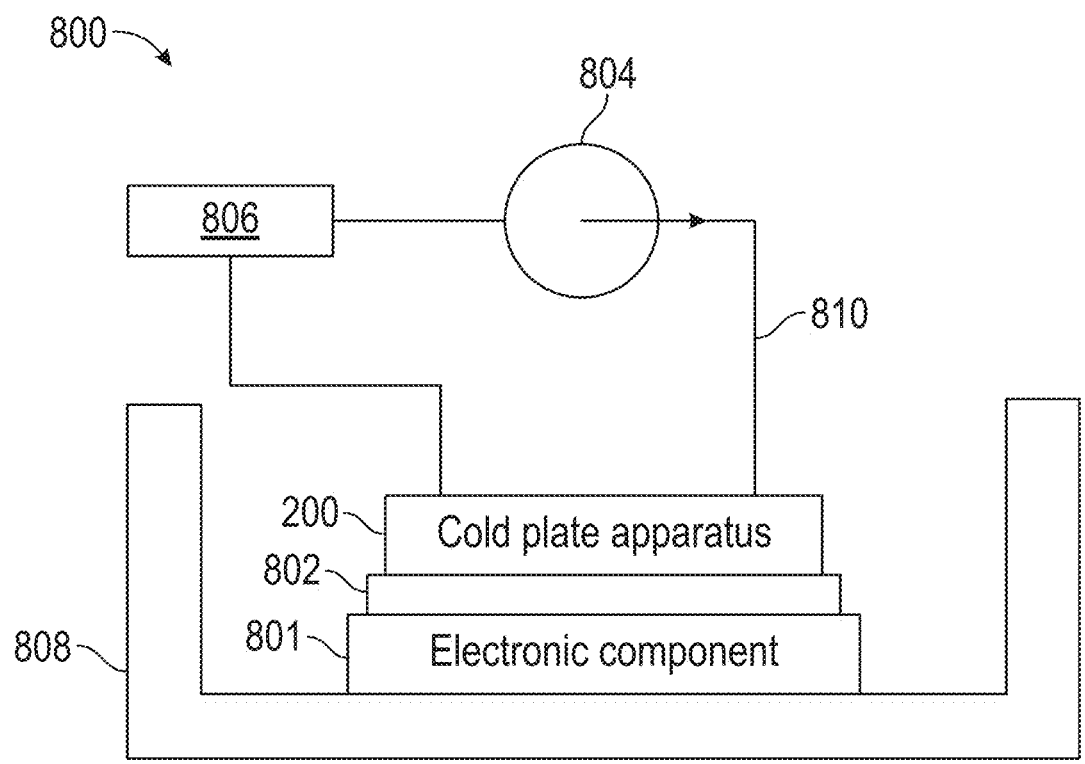
FIG. 11 depicts in a schematic an apparatus including an electronic component, a cold plate, and a pump, according to an exemplary embodiment.

According to another aspect, as shown in FIG. 11, in an apparatus 800 an electronic component 801 that dissipates heat (e.g., an integrated circuit chip) is attached to a cold plate apparatus 200 as described above. An intermediate thermal interface material (TIM) 802 may be provided between the electronic component 801 and the cold plate apparatus 200. A pump 804 forces liquid coolant through the cold plate 200 in a closed loop heat exchange system with an external heat exchanger 806 (shown) or through an open loop heat exchange system. In one or more embodiments, the cold plate apparatus 200 and the electronic component 801 are mounted in a cabinet or chassis 808 that constrains the piping 810 between pump 804 and cold plate 200 to be at an angle (e.g., in one or more embodiments greater than 50°; in other embodiments, greater than 70°; in other embodiments, greater than 85°) from the cold plate, substantially as shown.

Given the preceding description and the accompanying drawings, an ordinary skilled worker will appreciate that according to one aspect of this disclosure, an exemplary cold plate apparatus 200 comprises walls 201, 203 that enclose an interior volume that includes an inlet plenum 216, an outlet plenum 214, and an active volume 218 fluidly connecting the inlet plenum to the outlet plenum. The walls define an inlet opening 209 into the inlet plenum and an outlet opening 208 from the outlet plenum. The walls define an outlet transition 206 that connects the outlet plenum to the outlet opening. The outlet transition 206 defines a smoothly curving flow path from a direction along a long dimension of the outlet plenum, which is parallel to a plane defined by the outlet opening, to a direction along a centerline of the outlet opening, which is at an angle from the plane defined by the outlet opening. The outlet transition provides a smooth variation of cross-sectional area from the outlet plenum to the outlet opening.

In one or more embodiments, the outlet transition is coextensive with the outlet plenum at a first end and coextensive with the outlet opening at a second end. In one or more embodiments, the first end of the outlet transition is within a footprint of the outlet opening projected into the interior volume of the apparatus. In one or more embodiments, the first end of the outlet transition is offset from the centerline of the outlet opening toward the outlet plenum. In one or more embodiments, cross-sections of the outlet transition, taken in planes perpendicular to the centerline of the outlet opening, vary in radius from the bottom surface of the outlet plenum toward the upper surface of the outlet plenum. In one or more embodiments, the cross-sections of the outlet transition smoothly diminish in radius from the bottom surface of the outlet plenum toward the upper surface of the outlet plenum. In one or more embodiments, cross-sections of the outlet transition, taken in planes perpendicular to the centerline of the outlet opening, shift their centers toward the centerline of the outlet opening from the bottom surface of the outlet plenum toward the upper surface of the outlet plenum. In one or more embodiments, the cross-sections of the outlet transition shift their inward edges first toward and then beyond the centerline of the outlet opening, along the long direction of the outlet plenum, from the bottom surface of the outlet plenum toward the upper surface of the outlet plenum.

According to another aspect, an exemplary cold plate apparatus 200 comprises a top plate 201 that has an inlet opening 209 and an outlet opening 208 through it; a bottom plate 203; and a plurality of intermediate plates 210, 212, 220, 222 that are sandwiched between the top and bottom plates and attached to each other and to the top and bottom plates. Each intermediate plate has a cutout 211, and the cutouts of the plurality of intermediate plates overlap to define an interior volume enclosed by the top plate, the bottom plate, and the intermediate plates. The interior volume includes an active volume 218, an inlet plenum 216 at one side of the active volume, an outlet plenum 214 at another side of the active volume opposite the inlet plenum, an inlet transition 207 at an end of the inlet plenum overlapping the inlet opening, and an outlet transition 206 at an end of the outlet plenum overlapping the outlet opening. Inward edges of the cutouts of the intermediate plates are staggered so that the outlet transition defines a curving flow path from a direction along a long dimension of the outlet plenum, which is parallel to a plane defined by the outlet opening, to a direction along a centerline of the outlet opening, which is at an angle from the plane defined by the outlet opening.

In one or more embodiments, cutouts of the intermediate plates are staggered so that the outlet transition is coextensive with the outlet plenum at a first end and coextensive with the outlet opening at a second end, and the first end of the outlet transition is offset from the centerline of the outlet opening along the long direction of the outlet plenum. In one or more embodiments, the first end of the outlet transition is within a footprint of the outlet opening projected into the interior volume of the apparatus. In one or more embodiments, there are N+1 intermediate plates and inward edges of the intermediate plates are staggered so that a distance $D_i$ from an outward edge of the outlet opening to the inward edge of each intermediate plate i varies according to $D_i=D_i(1-(i-1)/N)$. In one or more embodiments, cross-sections of the outlet transition, taken at each intermediate plate perpendicular to the centerline of the outlet opening, vary in radius from the lowest intermediate plate toward the topmost intermediate plate. In one or more embodiments, the cross-sections of the outlet transition smoothly diminish in radius from the lowest intermediate plate toward the topmost intermediate plate. In one or more embodiments, cross-sections of the outlet transition, taken at each intermediate plate perpendicular to the centerline of the outlet opening, shift their centers toward the centerline of the outlet opening from the lowest intermediate plate toward the topmost intermediate plate. In one or more embodiments, the cross-sections of the outlet transition shift their inward edges first toward and then beyond the centerline of the outlet opening, along the long direction of the outlet plenum, from the lowest intermediate plate toward the topmost intermediate plate. In one or more embodiments, the inward edges of the cutouts of the intermediate plates are staggered to define an inlet transition similar to the outlet transition.

According to another aspect, an exemplary method 600 of making a cold plate apparatus 200 comprises obtaining a plurality of plates 201, 203, 210, 212, 220, 222; defining an inlet plenum 216, an active volume 218, an outlet plenum 214, an outlet opening 208, and an outlet transition 206 connecting the outlet plenum to the outlet opening, by shaping a cutout 211 in each plate and stacking the plurality of plates together in an assembly according to a final cold plate design; and bonding the plurality of plates together in the assembly. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening. In one or more embodiments, the outlet transition is coextensive with the outlet plenum at a first end and coextensive with the outlet opening at a second end. In one or more embodiments, the outlet transition varies in cross-sectional area from the first end to the second end.

In one or more embodiments, the method also comprises performing computational fluid dynamics analysis of an initial cold plate design, given design values of mass flow rate and fluid properties of a coolant flowing through the outlet transition; identifying significant turbulence or recirculation in the simulation of coolant flow through the outlet transition; generating the final cold plate design by adjusting curvature and cross-sectional areas of the outlet transition until computational fluid dynamics analysis indicates no significant turbulence and no significant recirculation at an optimum mesh size.

According to another aspect, an exemplary method 700 of directing coolant through a cold plate apparatus comprises at 708 redirecting the coolant from an outlet plenum bulk velocity of flow along a length of an outlet plenum to an outlet opening bulk velocity of laminar flow, at an angle from the outlet plenum bulk velocity, through an outlet opening that is connected in fluid communication with the outlet plenum; and releasing the coolant through the outlet opening. Redirecting the coolant from the outlet plenum bulk velocity to the outlet opening bulk velocity includes smoothly turning the direction of the coolant from the outlet plenum bulk velocity to the outlet opening bulk velocity, without significant recirculation or turbulence, inside an outlet transition structure 206 that is formed in the cold plate and connects the outlet plenum in fluid communication with the outlet opening.

According to another aspect, an exemplary apparatus comprises an electronic component that dissipates heat; a cold plate apparatus attached in thermal connection to the electronic component; and a pump that forces a liquid coolant through the cold plate apparatus. The cold plate apparatus comprises: a bottom portion surrounding an interior volume; and a top portion attached to the bottom portion and enclosing the interior volume. The top portion includes an outlet opening into the interior volume. The interior volume includes an outlet transition that connects the outlet opening to an outlet plenum. The outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening.

In one or more embodiments, the bottom portion comprises a bottom plate and a plurality of intermediate plates. The plurality of intermediate plates are attached to each other, to the bottom plate, and to the top portion. Cutouts of the plurality of intermediate plates define the interior volume of the apparatus.

In one or more embodiments, the outlet transition is coextensive with the outlet plenum and with the outlet opening and smoothly diminishes in cross-sectional area from the outlet plenum to the outlet opening.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of making a cold plate apparatus, the method comprising:
    obtaining a plurality of plates;
    defining an inlet plenum, an active volume, an outlet plenum, an outlet opening, and an outlet transition connecting the outlet plenum to the outlet opening, by shaping cutouts in the plurality of plates and stacking the plurality of plates together in an assembly according to a final cold plate design; and
    bonding the plurality of plates together in the assembly;
    wherein the outlet transition defines a smoothly curving flow path from a direction along a long dimension of the outlet plenum, which is parallel to a plane defined by the outlet opening, to a direction along a centerline of the outlet opening, which is at an angle from the plane defined by the outlet opening, and wherein sidewalls of the outlet plenum are defined by the cutouts in the plurality of plates.

2. The method of claim 1, wherein the outlet transition is coextensive with the outlet plenum at a first end and coextensive with the outlet opening at a second end.

3. The method of claim 1, wherein the outlet transition varies in cross-sectional area from the first end to the second end.

4. The method of claim 3, further comprising:
    performing computational fluid dynamics analysis of an initial cold plate design, given design values of mass flow rate and fluid properties of a coolant flowing through the outlet transition;
    identifying turbulence or recirculation in the simulation of coolant flow through the outlet transition; and
    generating the final cold plate design by adjusting curvature and cross-sectional areas of the outlet transition until computational fluid dynamics analysis indicates no turbulence and no recirculation at an optimum mesh size.

5. The method of claim 1, wherein the plurality of plates is bonded together using water tight bonds.

6. The method of claim 1, wherein cross-sections of the outlet transition, taken in planes perpendicular to the centerline of the outlet opening, vary in radius from a bottom surface of the outlet plenum toward an upper surface of the outlet plenum.

7. The method of claim 1, wherein the smoothly curving flow path comprises steps formed by the plurality of plates bonded together in the assembly.

8. The method of claim 7, wherein the smoothly curving flow path comprises at least five of the steps.

9. A method of directing coolant through a cold plate apparatus, the method comprising:
    redirecting the coolant from an outlet plenum bulk velocity of flow along a length of an outlet plenum to an outlet opening bulk velocity of laminar flow, at an angle from the outlet plenum bulk velocity, through an outlet opening that is connected in fluid communication with the outlet plenum; and
    releasing the coolant through the outlet opening;
    wherein redirecting the coolant from the outlet plenum bulk velocity to the outlet opening bulk velocity includes smoothly turning the direction of the coolant from the outlet plenum bulk velocity to the outlet opening bulk velocity, without recirculation or turbulence, inside an outlet transition structure formed in the cold plate apparatus and connecting the outlet plenum in fluid communication with the outlet opening,
    wherein the cold plate apparatus comprises a plurality of stacked plates, and wherein the outlet transition structure and sidewalls of the outlet plenum are defined by cutouts in the plurality of stacked plates.

* * * * *